United States Patent
Razumov

(10) Patent No.: US 7,496,526 B2
(45) Date of Patent: Feb. 24, 2009

(54) METHOD AND SYSTEM FOR SELLING CLOTHES

(76) Inventor: Sergey N. Razumov, Electricheskiy Pereulok, dom 8, korpus 4 kvartira 7, Moscow (RU)

( * ) Notice: Subject to any disclaimer, the term of this patent is extended or adjusted under 35 U.S.C. 154(b) by 1137 days.

(21) Appl. No.: 09/891,321

(22) Filed: Jun. 27, 2001

(65) Prior Publication Data

US 2003/0028436 A1    Feb. 6, 2003

(51) Int. Cl.
*G06Q 30/00* (2006.01)
(52) U.S. Cl. .............................. 705/26; 705/27; 705/10; 705/14; 345/418; 345/419; 700/130; 700/132
(58) Field of Classification Search .................. 705/27, 705/26
See application file for complete search history.

(56) References Cited

U.S. PATENT DOCUMENTS

| | | | | | |
|---|---|---|---|---|---|
| 4,149,246 | A | * | 4/1979 | Goldman | 700/132 |
| 4,261,012 | A | * | 4/1981 | Maloomian | 348/77 |
| 5,163,006 | A | * | 11/1992 | Deziel | 700/132 |
| 5,515,168 | A | * | 5/1996 | Dudkiewicz | 356/612 |
| 5,551,021 | A | * | 8/1996 | Harada et al. | 707/104.1 |
| 5,557,527 | A | * | 9/1996 | Kotaki et al. | 700/131 |
| 5,680,528 | A | | 10/1997 | Korszun | 345/630 |
| 5,850,222 | A | | 12/1998 | Cone | 345/418 |
| 5,930,769 | A | | 7/1999 | Rose | 705/21 |
| 6,307,568 | B1 | * | 10/2001 | Rom | 345/629 |

(Continued)

FOREIGN PATENT DOCUMENTS

KR    2001092993    *    3/2000

OTHER PUBLICATIONS

Bailey Jr. et al, "Accounting and the Internet," 1998, New Accountant, pp. 5-8.*

(Continued)

*Primary Examiner*—F. Zeender
*Assistant Examiner*—Fawaad Haider
(74) *Attorney, Agent, or Firm*—McDermott Will & Emery LLP

(57) ABSTRACT

A novel system provided for selling goods has an electronic device configured to enable a customer to access a group of items pre-selected for the customer based on an evaluation made when the goods are tried on by a human model having similar individual characteristics as the customer. The evaluation is performed by the human model trying on the goods to evaluate whether the goods fit the customer, and/or by an expert evaluating whether the goods are suitable for a human model trying on the goods. The goods are classified in accordance with a pre-set classification. Human models are selected to represent categories of the pre-set classification. The goods are tried on by the human models of the respective categories, and are evaluated to determine evaluation marks. Individual characteristics of a customer are obtained to determine to which category in the pre-set classification the customer belongs. The customer is enabled to access a group of items pre-selected based on the evaluation marks for the goods in the category to which the customer belongs. The retail system involved in selling clothes items may comprise a plurality of retail facilities for selling pre-ordered food products. An ordering mechanism is provided for enabling customers to order clothes items, together with the food products, for delivery at a designated retail facility.

14 Claims, 4 Drawing Sheets

U.S. PATENT DOCUMENTS

| | | | |
|---|---|---|---|
| 6,310,627 B1* | 10/2001 | Sakaguchi | 345/630 |
| 6,404,426 B1* | 6/2002 | Weaver | 345/419 |
| 6,415,199 B1* | 7/2002 | Liebermann | 700/132 |
| 6,435,386 B2* | 8/2002 | Scott | 223/66 |
| 6,490,534 B1* | 12/2002 | Pfister | 702/94 |
| 6,546,309 B1* | 4/2003 | Gazzuolo | 700/132 |
| 6,701,207 B1* | 3/2004 | Gazzuolo | 700/132 |
| 6,711,455 B1* | 3/2004 | Holloway et al. | 700/132 |
| 6,912,293 B1* | 6/2005 | Korobkin | 382/100 |
| 6,968,075 B1* | 11/2005 | Chang | 382/111 |
| 2001/0026272 A1* | 10/2001 | Feld et al. | 345/419 |
| 2002/0138170 A1* | 9/2002 | Onyshkevych et al. | 700/130 |
| 2002/0188372 A1* | 12/2002 | Lane et al. | 700/130 |
| 2003/0011590 A1* | 1/2003 | Kung et al. | 345/419 |
| 2003/0050864 A1* | 3/2003 | Trajkovic et al. | 705/27 |
| 2004/0078285 A1* | 4/2004 | Bijvoet | 705/26 |
| 2005/0022708 A1* | 2/2005 | Lee | 112/186 |
| 2005/0234782 A1* | 10/2005 | Schackne et al. | 705/27 |

OTHER PUBLICATIONS

Miller, Norman. Retail leasing in the Web enabled world, Apr.-Jun. 2000, Journal of Real Estate Portfolio Management, vol. 6, No. 2, pp. 167-184.*

Buss, Dale. The little guys strike back, Jul. 1996, Nation's Business, vol. 84, No. 7, p. 18.*

Lands' End Site Will Let Users Model Clothes on Body Type, Nov. 1998, Wall Street Journal, col. 1, p. 12.*

* cited by examiner

METHOD AND SYSTEM FOR SELLING CLOTHES

FIELD OF THE INVENTION

The present invention relates to clothes retail system, and more particularly to method and system for selling clothes using facilities remote with respect to storage facilities.

BACKGROUND ART

When clothes is sold via the Internet or using mail-order catalogs, customers do not have the opportunity to try on garmets before ordering and must guess which size they would be in a given manufacturer's clothing line. Various computer graphics systems are offered to assist customers.

For example, U.S. Pat. No. 5,850,222 discloses a virtual dressing room system (VDRS) for displaying computer-generated images representing clothing on a human body. The VDRS receives a series of contour lines defining the three-dimensional shape of the human body, and a sequence of points defining the two-dimensional shape of the clothing. For each point of the two-dimensional shape, the VDRS identifies a corresponding point on a contour line of the body, and adjusts the point of the two-dimensional shape of the clothing to correspond to the identified point. The VDRS renders the shape of the human body on a display device, and lenders the scaled and adjusted two-dimensional shape of the clothing on the display device to imitate the display of the human body wearing the clothing.

U.S. Pat. No. 5,680,528 discloses a digital dressing room system which allows a customer to select and virtually try on different garment images of the database. The system uses computer graphics to display an image of the customer's body in the garments based on the customer's body measurements. The system's database includes images of human bodies representing a specific "body-type" classification, and images of garmets to be "tried on." Using the image processing techniques, the system transforms the human body image to reflect the customer's measurements, such as bust, waist, hips and height, and transforms the image of garmets to fit the customer's body. The result is a rendering of a clothing ensemble as it would drape a body with the client's measurements.

U.S. Pat. No. 5,930,769 discloses a method of manual fashion shopping by a customer using a video device. The method comprises receiving the customer's body measurements, and providing a database including graphic images of clothing items. The database enables the customer to select clothes item among all items for each fashion category. The shopping system determines a size of the customer, and outputs the closest size to the computer screen or printer. For this size, the system generates a virtual mannequin of the customer's body, which shows the customer how a selected fashion will fit and look.

Hence, conventional systems produce computer-generated images showing how a particular garment will look on a particular customer. However, computer-generated images are generated based on mathematical models of image processing and cannot accurately represent human bodies. As a result, the garments ordered by customers do not fit properly and must be returned.

In addition, conventional systems do not consider evaluations made by human models, which try on garments, and/or experts, which are present when models try on garments. Therefore, conventional system cannot pre-select garments suitable for a particular customer based on evaluations by the models and/or experts as to whether a selected garment fits the customer.

Accordingly, in conventional systems, customers have to choose among hundreds of articles corresponding to a particular size, rather than among a much smaller group of articles pre-selected by models and/or experts for a particular type of a customer. As a result, Internet-based clothes shopping becomes slow and cumbersome.

Therefore, there exists a long-felt need for a way to alleviate the difficulties of selling clothes via a telecommunications network such as the Internet.

SUMMARY OF THE INVENTION

The present application provides a novel system for selling goods, comprising an electronic device configured to enable a customer to access a group of items pre-selected for the customer based on an evaluation made when the goods are tried on by a human model having similar individual characteristics as the customer.

In accordance with an embodiment of the invention, the evaluation may be performed by the human model trying on the goods to evaluate whether the goods fit the customer.

Alternatively, the evaluation may be performed by experts evaluating whether the goods are suitable for a human model trying on the goods. In accordance with one aspect of the invention, the customer is enabled to choose the items pre-selected based on evaluations made by experts having a desirable fashion orientation. For example, the customer may choose items based on evaluations of experts in conservative clothes or experts in clothes for young people.

The electronic device may be configured to enable the customer to watch images depicting a human model wearing the pre-selected items and having similar individual characteristics as the customer. For example, the electronic device may display video images showing the human models in motion.

The customer may be enabled to access data on additional items associated with each of the pre-selected items. The additional items may be pre-selected by fashion experts when the goods are tried on by the human model. For example, for a suit, fashion experts may preselect ties, shirts and/or shoes matching the suit.

In accordance with an embodiment of the invention, the goods being sold may include clothes items. The customer may be enabled to order a desired clothes item and to pick-up the ordered item at a designated retail facility.

An assignment mechanism may be provided for automatically assigning a fitting room at the retail facility for the customer that wants to pick up the ordered item, when the customer is identified.

The system of the present invention may include a plurality of retail facilities supplied by a storage facility for selling food products, and a special-purpose warehouse for storing the goods evaluated when the goods are tried on by the human model. The ordered goods may be transferred from the special-purpose warehouse to the designated retail facility of the plurality of retail facility for selling food products.

In accordance with a method of the present invention, the following steps are carried out for selling good:
classifying goods in accordance with a pre-set classification,
selecting human models representing categories of the pre-set classification,
trying on the goods by the human models of the respective categories, evaluating the goods when the goods are tried on to determine evaluation marks, obtaining individual characteristics of a customer to determine to which category in the pre-set classification the customer belongs, and enabling the customer to access a group of items preselected based on the evaluation marks for the goods in the category to which the customer belongs.

The evaluation marks may be determined by experts based on a judgement as to whether the goods are suitable for the models wearing those goods.

The pre-set classification may take into account body types of customers, color of customer's hair and eyes, tone of customer's skin, etc.

In accordance with one aspect of the invention, the retail system may comprise a plurality of retail facilities for selling pre-ordered food products, and an ordering mechanism for enabling customers to order clothes items, together with the food products, for delivery at a designated retail facility. The ordering mechanism includes an electronic device configured for displaying video images of human models wearing the clothes items.

Also, the retail facility of the present invention may include a storage facility for serving the retail facilities in a particular area, and a clothes warehouse for storing available clothes items. The ordered clothes items may be delivered from the clothes warehouse to the storage facility that serves the designated retail facility. The ordered clothes items may be delivered from the storage facility to the designated retail facility, together with the food products to be delivered to the designated retail facility.

Still other aspects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and entities are shown in schematic form in order to avoid unnecessarily obscuring the present invention.

Figure 1:
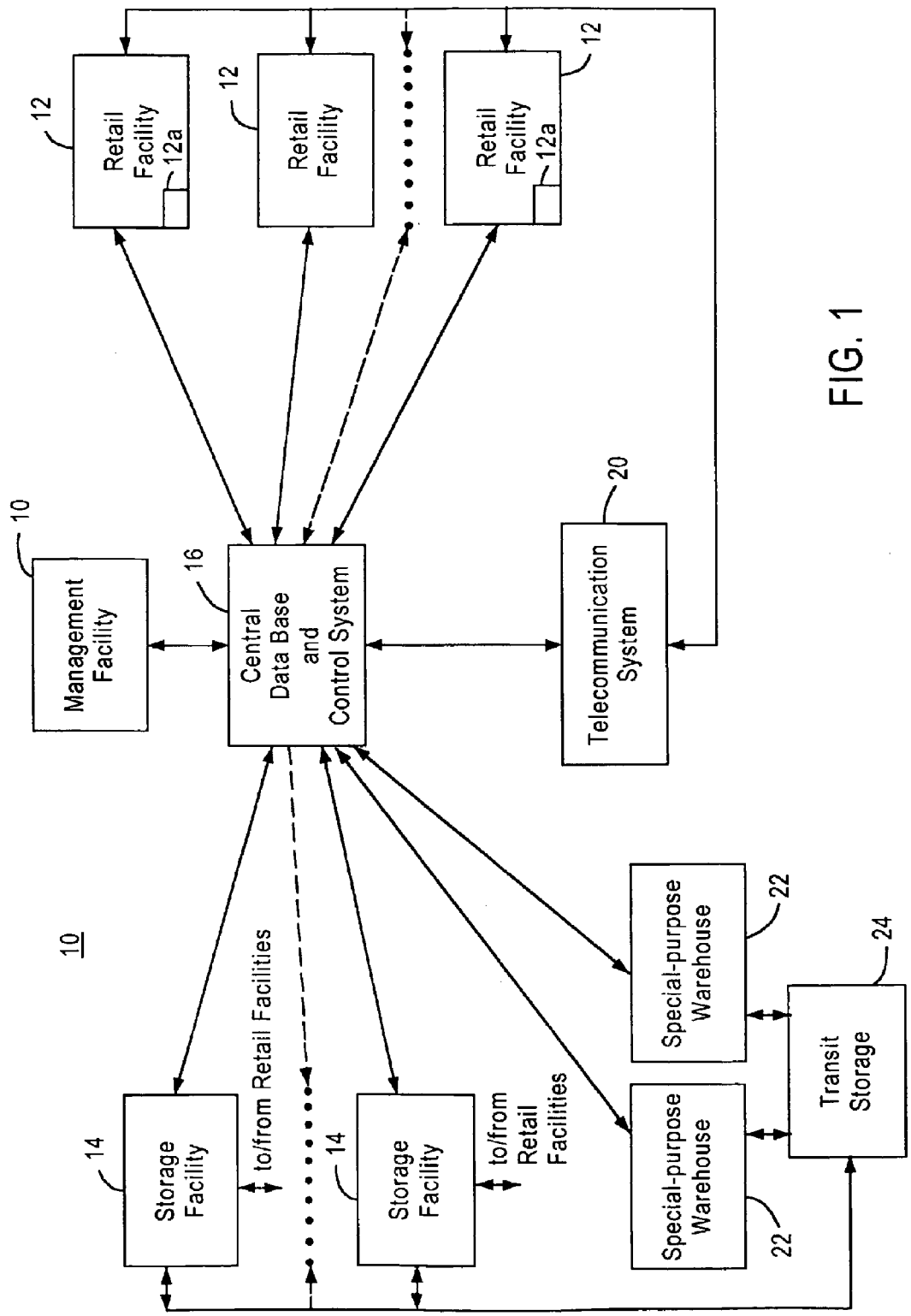
FIG. 1 illustrates a retail system of the present invention.

As schematically illustrated in FIG. 1, a retail system 10 of the present invention may comprise a plurality of retail facilities 12 for enabling customers to order and/or receive purchases, a plurality of general storage facilities 14, a central data base and control system 16, a management facility 18, and a telecommunications system 20, such as an Internet-based communications network.

Inventories of the general storage facilities 14 include regular goods being sold via the retail facilities 12, such as food products, consumer goods, video/audio products, etc. In addition, the retail system 10 may include a number of special-purpose warehouses 22 for storing specialty items, such as clothes, furniture, shoes, spare parts for cars, etc.

A delivery system is provided to enable delivery of goods to the storage facilities 14, and from the storage facilities 14 to the retail facilities 12. Also, the delivery system provides delivery of goods from the special-purpose warehouses 22 to the storage facilities 14. For example, one or more transit storages 24 may be arranged to provide transit storage of goods being moved between the special-purpose warehouses 22 and the storage facilities 14.

Each retail facility 12 may be a purchase ordering facility that enables a customer to place an order for a purchase, or a purchase check-out facility that provides the check-out of the purchase ordered by the customer. Alternatively, the purchase ordering facility may be combined with the check-out facility.

A location for placing an order for a purchase is independent from the location where the ordered purchase may be checked out and picked up. While a customer may place an order and receive the ordered purchase at the same retail facility 12, the customer is enabled to order a purchase at one retail facility 12, and receive the ordered purchase at another retail facility 12. For example, a customer may place a purchase order at the retail facility 12 located near the customer's place of business, and receive the ordered purchase at the retail facility 12 located near the customer's residence.

The purchase ordering arrangement is disclosed in more detail in my copending U.S. patent application Ser. No. 09/745,420 filed on Dec. 26, 2000, entitled "Retail System with Purchase Ordering" and incorporated herewith by reference. The purchase check-out arrangement is disclosed in more detail in my copending U.S. patent application Ser. No. 09/788,674 filed on Feb. 21, 2001, entitled "Purchase Check-out Arrangement in Retail System" and incorporated herewith by reference.

The general storage facilities 14 are provided for storing goods, such as food products, which are regularly being sold via the retail facilities 12. Also, the general storage facilities 14 provide collecting specialty items being delivered from the special-purpose warehouses 22 to prepare the ordered purchases to be delivered to the respective retail facility 12. For instance, one general storage facility 14 may be provided in a particular area to supply the retail facilities 12 arranged in that area with the ordered purchases that may include specialty items.

Each special-purpose warehouse 22 may be arranged for storing a particular category of goods. For example, in accordance with the present invention, one or more special-purpose warehouses 22 is provided for storing articles of clothing. A customer is enabled to order a garment stored in the special-purpose warehouse 22 from any retail facility 12 or via the Internet. Via the respective storage facility 14, the ordered garment will be delivered to the retail facility 12 selected by the customer for picking-up the ordered purchase. Alternatively, the ordered garment may be delivered from the respective storage facility 14 to the customer's place of work or residence.

The central data base and control system 16 performs collection, storage and processing of data required to support operations of the retail system 10. Also, the central data base and control system 16 supports interactions between various elements of the retail system 10. For example, the central data base and control system 16 may provide the storage facilities 14 and special-purpose warehouses 22 with purchase order information in response to purchase order requests from the retail facilities 12.

The management facility 18 performs management and administrative functions required to support operations of the retail system 10. For example, the management facility 18 may monitor retail system operations to detect and correct errors and malfunctions. Also, the management facility 18 may be responsible for maintaining adequate amount of goods at the storage facilities 14 and special-purpose warehouses 22, collecting and analyzing sales information, marketing, and establishing prices.

The telecommunications system 20 enables customers to place purchase orders from locations remote with respect to the retail system facilities. In particular, the retail facilities 12 of the present invention may provide the check-out of purchases ordered via the Internet or a telephone system. The telecommunications system 20 may support the customer's access to the central data base and control system 16 to receive information on product availability and prices.

To facilitate the ordering process, the customer may be provided with a data storage device, such as a CD-ROM device, which contains information on items available in the retail system 10. The telecommunications system 20 may connect the customer's data storage device to the central data base and control system 16 to update the information stored by the data storage device.

The telecommunications system 20 transmits information on a purchase order placed by a customer to the central data base and control system 16 for arranging purchase delivery to the retail facility 12 selected by the customer or to another location selected by the customer, such as his place of work or residence.

Alternatively, the telecommunications system 20 may support placing an order via a telephone system. In this case, a customer can place a telephone call to an operator to order a purchase composed of items selected based on the information provided by the operator or using a catalog.

In accordance with the present invention, each retail facility 12 of the present invention may contain one or more purchase ordering terminals 12a that enable customers to order selected clothes items. The purchase ordering terminal 12a may include a personal computer interacting with a high-capacity compact memory device, such as a CD-ROM, DVD, etc. A single high-capacity purchase ordering memory device may be provided for multiple purchase ordering terminals installed in the retail facility 12.

The memory device may contain data on all clothes items available for sale in the retail system 10, and a program that defines an algorithm of purchase ordering using the purchase ordering terminal. As discussed in more detail later, the purchase ordering algorithm enables the terminal to display images of available clothes items. In particular, a customer is enabled to watch images that show human models wearing available garments. These images may be displayed in a still mode presenting still pictures that depict human models at different angles, and in a video mode presenting video clips that show human models in motion.

To facilitate selection, the purchase ordering terminal may be provided with a touch-screen monitor that enables customers to make selection by touching required items displayed on the screen.

In addition, the purchase ordering terminal may display a graphical presentation showing non-clothes items available for sale in the retail system 10. In particular, the purchase ordering terminal may present an electronic catalog including available non-clothes goods, such as food products, consumer goods, and video/audio products. A selection circuit may be provided to enable customers to select a desired purchase ordering mode.

The central base and control system 16 periodically updates data on clothes and non-clothes items stored in local purchase ordering memory devices of the retail facilities 12 to reflect changes in the inventory.

Alternatively, clothes and non-clothes items available in the retail system 10 may be ordered using the Internet, interactive television, or a local data base, such as a CD-ROM device.

Figure 2A:
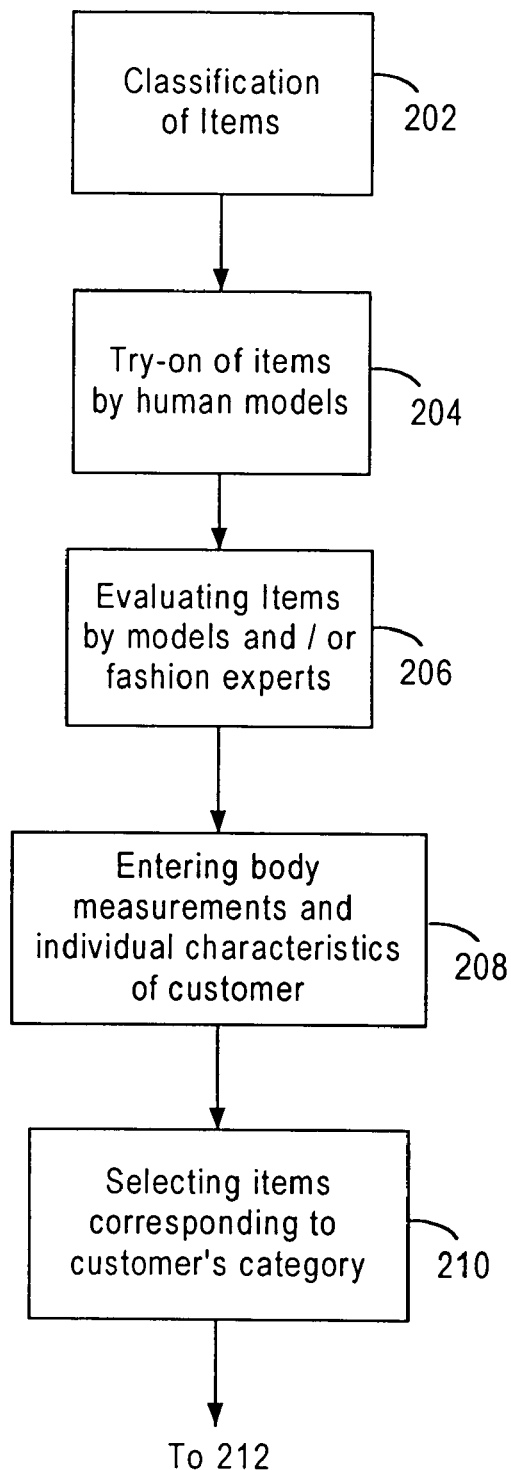
FIGS. 2A-2B show a block-diagram illustrating the method of selling clothes in accordance with the present invention.
Figure 2B:
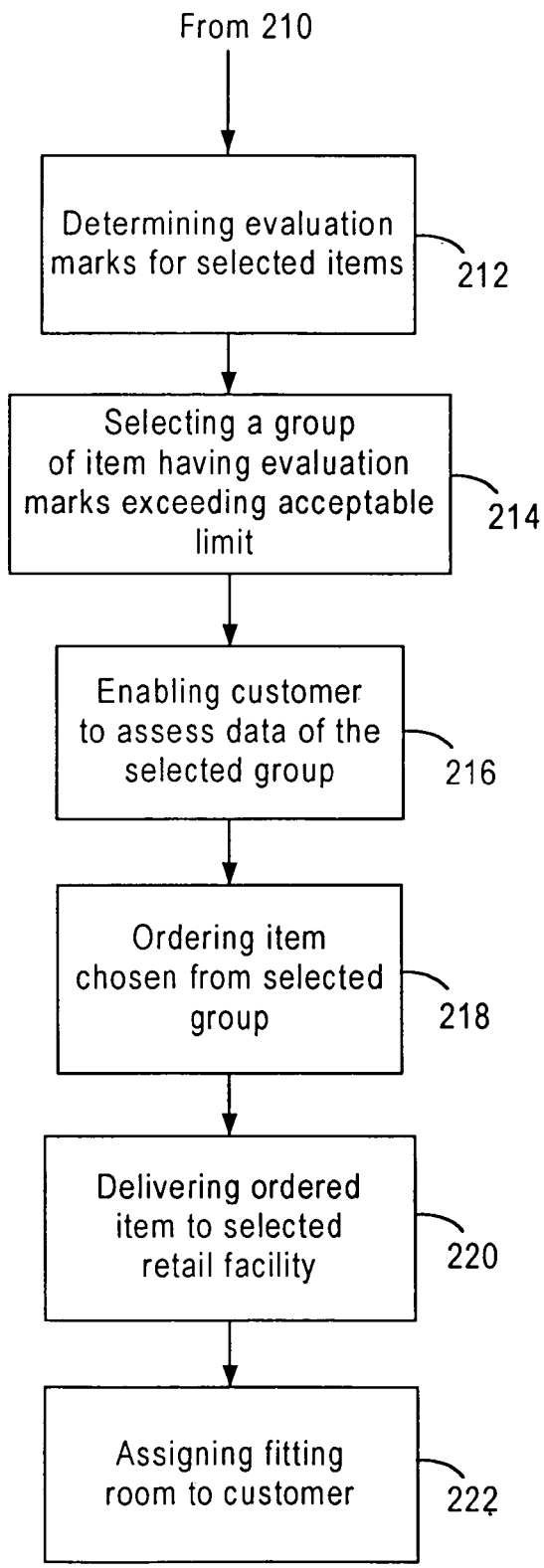

FIGS. 2A-2B show a block-diagram illustrating a method of selling clothes in accordance with the present invention. Clothes items available for sale are classified in accordance with their types, such as dresses, suits, jackets, sweaters, etc., and particular body measurements (step 202). One skilled in the art would recognize that a body of certain measurements belongs to a specific "body" classification. In any body classification, there are certain number of body types, each of which is defined as an individual's skeleton or bone frame plus an amount of flesh surrounding a specific anatomical part.

Figure 3:
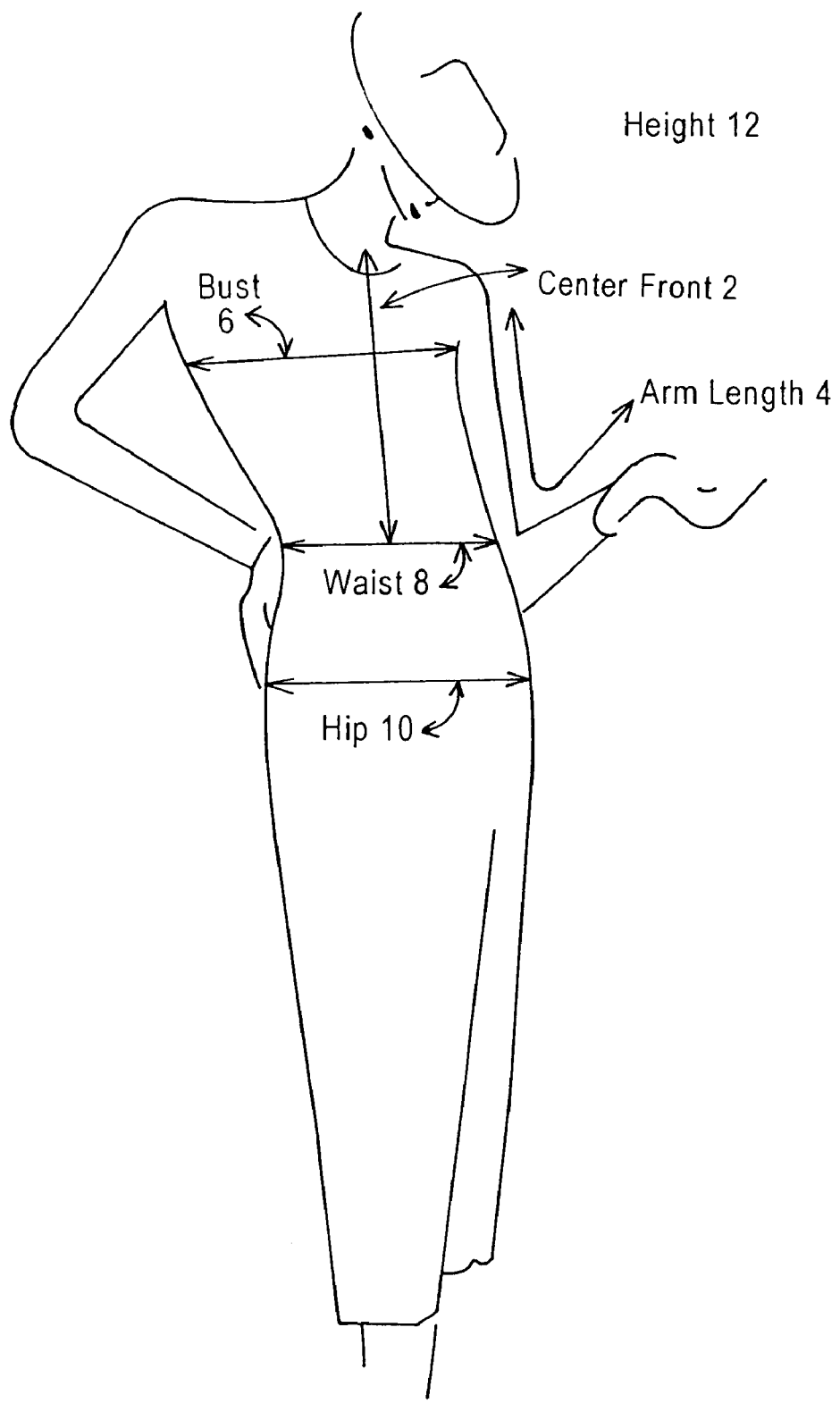
FIG. 3 shows a body frame illustrating body measurements.

For example, FIG. 3 shows a body frame illustrating body measurements disclosed in U.S. Pat. No. 5,930,769. These body measurements are examplary measurements that may be used for the classification of clothes items. The body measurements may include center front 2, arm length 4, bust 6, waist 8, hip 10,and height 12. For pants, additional measurements including inseam, center length and center depth may be necessary.

In accordance with the American Fashion Industries categories, clothes items for women are classified by petite, junior petite, missy, junior, large and halfsize categories. For men, there are slim, athletic, stout and portly stout categories. For children, the clothes categories are infant, toddler, children, pre-teen and teen.

Each of the categories represent a number of body types. For example, the petite woman can be one of four different body types including the full-bust/slight hip stature, normal stature, without a waistline stature, and slight bust/fuller hip stature.

In accordance with the present invention, the classification of clothes items may be performed using any classification. For example, the classification of clothes items may be based on the body types described above, and additional individual's characteristics such as color and/or tone of hair, eyes and/or skin.

The classification of the present invention may be independent of regular classification adopted in the fashion industry. As a result, the clothes selling system of the present invention is able to handle clothes items classified in accordance with various classifications. For example, the clothes items may be classified based on a pre-selected number of body types exceeding the number of body types used in regular classifications adopted in the fashion industry.

The clothes items available for sale are tried on by human models that fit a classification of the clothes items selected for the system of the present invention (step 204). For example, the human models may be selected based on their body type, and color and/or tone of hair, eyes and/or skin. Each category of the classification is represented by at least one model who tries on all clothes items that belong to the respective category.

The human models wearing the respective clothes items may be photographed and/or videotaped to prepare still pictures depicting the models at different angles, and video clips showing the models in motion.

The human models are requested to evaluate the clothes items which they are wearing (step 206). Also, a fashion expert may be present when a model is wearing clothes items. In this case, the experts are requested to evaluate the clothes items.

In accordance with one aspect of the invention, clothes items may be evaluated by an expert group including fashion experts of different fashion orientations. For example, the expert group may include an expert in conservative clothes, an expert in modem clothes, an expert in clothes for young people, etc.

The model's and/or expert's evaluations consider whether a particular clothes item is suitable to the model who wears it. In particular, the evaluations of clothes items may address such issues as:

whether a particular clothes item fits the model,
whether the model feels comfortable when weares the clothes item,
whether the color and/or tone of the clothes item matches the color and/or tone of the model's hair, eyes and/or skin,
whether the style of the clothes item is appropriate for a particular body type.

In addition, the evaluations of clothes items may take into account any taste-related or other subjective considerations. A result of an evaluation of each clothes item made by a model and/or a fashion expert is expressed as an evaluation mark, for example in the range from 5 to 1, where 5 may be the highest mark. If a particular clothes item is evaluated by an expert group, each fashion expert in the group puts down a separate evaluation mark for the evaluated clothes item.

In accordance with one aspect of the invention, fashion experts may further choose items associated with the clothes item being evaluated. For example, fashion experts may choose ties, shirts and/or shoes that match the suit being evaluated. Data identifying the associated items chosen by fashion experts are entered into the system database, in association with data on the clothes item being evaluated.

In accordance with the method of the present invention, to initiate a clothes ordering procedure, customers use the purchase ordering terminal in the retail facility 12 to enter their body measurements, and individual characteristics such as the color and/or tone of their hair, eyes and/or skin (step 208). A sales assistant may be available to assist the customers in determining required information. Also, the customers selects a desired type of clothes, such as a dress, suit or jacket, and desired features of clothes, for example, color or style. Also, the customer may select a desired price range for a particular clothes item.

Based on the body type and individual characterists of the customer, the system determines to which category in the selected classification of clothes items a particular customer belongs. In accordance with one aspect of the invention, the category assigned to a customer corresponds to a model having similar body type and individual characteristics as the customer.

In accordance with an embodiment of the invention, customers may enter their body measurements and individual characteristics only when they use the system for the first time. The customer's information may be stored in the system and may be automatically retrieved when the customer identifies herselves during subsequent ordering procedures.

Based on the category assigned to a customer, the system selects which clothes items of the desired type and characteristics belong to the customer's category (step 210), and determines the evaluation marks of the selected items (step 212). The customer is enabled to choose an acceptable threshold level of the evaluation marks. For example, the customer may choose to browse the selected items having the evaluation marks higher than 3 in the range from 5 to 1.

Based on the selected acceptable threshold, the system selects a group of the clothes items having the evaluation marks higher that the acceptable threshold (step 214).

In accordance with one aspect of the present invention, a customer may request the system to select a group of clothes items based on evaluation marks put down by fashion experts of a selected fashion orientation. For example, a group of the clothes items may be selected based on evaluations made by experts in conservative clothes, or experts in clothes for young people.

Thereafter, the system enables the customer to access data of the selected group (step 216). The data of the clothes items in the selected group may include still pictures depicting the human models wearing the respective clothes item at different angles, video clips showing the models in motion, computer-generated images representing clothes items and models wearing them, etc. Also, the data on clothes items may include such information as manufacturer's data, type of material, price, product care information, etc.

Thus, customers do not need to review all clothes items relating to their size. Instead, they need to consider a smaller group of items pre-selected based on evaluations performed by models wearing clothes items and/or fashion experts.

In accordance with an embodiment of the invention, any clothes item considered by a customer may be accompanied by data relating to associated items pre-selected by fashion experts during the try-on procedure. For example, each selected suit may be accompanied by a list of shirts, ties and/or shoes matching that suit.

When customers make their choice, they are enabled to order a selected clothes item and the associated items (step 218). The purchase order identifies a retail facility 12, in which a customer wants to pick up the ordered purchase.

Alternatively, steps 208-218 may be carried out using the Internet cite or a local database with a graphical user interface enabling customers to enter their information and select desired items among a group of clothes items selected based on respective evaluation marks in the manner similar to the procedure disclosed above. Also, a customer may request delivery of the ordered purchase to customer's place of work or residence.

Via the central data base and control system 16, a customer's order is transferred to a special-purpose warehouse 22 that stores clothes items. The ordered clothes item is delivered from the special-purpose warehouse 22 to the storage facility 14 responsible for supplying the retail facility 12 selected by the customer. The transit storage 24 may be used for moving clothes items between the special-purpose warehouse 22 and the storage facility 14. Together with other goods delivered from storage facility 14, such as food products, consumer goods, etc., the ordered clothes items are delivered to the selected retail facility 12 (step 220).

The retail facility 12 may be equipped with a plurality of fitting rooms to enable customers to try on ordered clothes items before buying them. When a customer enters the retail facility 12, he or she is identified by the central data base and control system 16. The customer may be identified, for example, by a customer's card issued to customers of the retail system 10, or by the confirmation number of the purchase order.

When the customer is identified, the central data base and control system 16 automatically assigns a fitting room to that customer (step 222), and supplies a sales assistant with a request for delivery the ordered clothes item to the assigned fitting room.

If the customer is satisfied with the delivered clothes item, he or she buys it. Otherwise, the clothes item may be returned to the special-purpose warehouse 22.

Although the present invention is disclosed with an example of selling clothes, the invention may facilitate selling of any goods because it enables customers to select goods among a relatively small group of items pre-selected for particular customers, instead of considering all available items. For example, the present invention is applicable to selling shoes.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method of selling goods, comprising the steps of:
    selecting human models representing categories of a pre-set classification of goods,
    trying on the goods by the human models of the respective categories, at least one model is assigned for trying on goods that belong to a category of the classification,
    obtaining body measurements of a customer to determine to which category in a pre-set classification of goods the customer belongs,
    based on the body measurements, assigning by a computer system to the customer the category that corresponds to a human model having individual characteristics corresponding to the body measurements of the customer,
    determining by the computer system quantitative evaluation marks for the goods in the category assigned to the customer, each evaluation mark being in a range from a lower mark to a higher mark, the evaluation marks being pre-set based on evaluating the goods tried on by the respective model,
    pre-selecting by the computer system based on the determined evaluation marks, a group of items among the goods in the category assigned to the customer, and
    enabling the customer to access said group of items.

2. The method of claim 1, wherein the customer is enabled to watch video images depicting in motion the human models wearing the pre-selected items.

3. The method of claim 1, wherein the evaluation is performed by the human models wearing the goods.

4. The method of claim 1, wherein the goods include clothes items.

5. The method of claim 1,.wherein the evaluation is performed by an expert based on a judgment as to whether the goods are suitable for the models wearing those goods.

6. The method of claim 1, wherein the customer is enabled to select the goods based on the evaluation of an expert having a predetermined fashion preference.

7. The method of claim 1, wherein the pre-set classification takes into account body types of customers.

8. The method of claim 7, wherein the pre-set classification further takes into account color of customer's hair.

9. The method of claim 7, wherein the pre-set classification further takes into account color of customer's eyes.

10. The method of claim 1, wherein the pre-set classification takes into account tone of customer's skin.

11. The method of claim 1, wherein the customer is enabled to access data on additional items associated with each of the pre-selected items.

12. The method of claim 11, wherein the additional items are pre-selected when the goods are tried on by the human model.

13. The method of claim 12, wherein the additional items are pre-selected by fashion experts.

14. The method of claim 1, further comprising the step of selecting a threshold of evaluation marks acceptable for the customer, wherein the pre-selected group of items has the evaluation marks higher than the threshold.

* * * * *